United States Patent
Turner (10) Patent No.: US 6,401,369 B1
(45) Date of Patent: Jun. 11, 2002

(54) GRUBBING TOOL

(76) Inventor: Oral Edison Turner, 708 Marylord, Big Lake, TX (US) 76932

( * ) Notice: Subject to any disclaimer, the term of this patent is extended or adjusted under 35 U.S.C. 154(b) by 21 days.

(21) Appl. No.: 09/656,285

(22) Filed: Sep. 6, 2000

(51) Int. Cl.⁷ .............................................. A01B 13/00
(52) U.S. Cl. ............................ 37/301; 37/302; 37/404
(58) Field of Search ......................... 37/302, 301, 303, 37/403, 468, 404, 407; 144/24.12, 334; 172/720, 700, 699, 698, 725

(56) References Cited

U.S. PATENT DOCUMENTS

| | | | |
|---|---|---|---|
| 2,652,639 A | * | 9/1953 | Kluckhohn |
| 2,770,076 A | * | 11/1956 | Kluckhohn |
| 2,877,572 A | * | 3/1959 | Dyess |
| 3,032,123 A | * | 5/1962 | Brown |
| 3,353,285 A | | 11/1967 | Murray |
| 3,418,734 A | | 12/1968 | McConnell |
| 3,512,276 A | | 5/1970 | Juhl |
| 4,321,761 A | | 3/1982 | Hedblom |
| D264,213 S | * | 5/1982 | Hedblom |
| 4,356,644 A | | 11/1982 | Harkness |
| 4,895,211 A | | 1/1990 | Harris |
| 5,133,268 A | | 7/1992 | Delisle |
| 5,490,340 A | | 2/1996 | Muncy |
| 5,628,130 A | | 5/1997 | Desrochers |
| 5,909,714 A | * | 6/1999 | Stoner |
| 5,921,302 A | * | 7/1999 | Petersen |
| 5,950,549 A | * | 9/1999 | Stoner |
| 6,035,562 A | * | 3/2000 | Virnig et al. |

FOREIGN PATENT DOCUMENTS

| | | | | |
|---|---|---|---|---|
| FR | 1413242 | * | 8/1965 | .................. 37/302 |
| GB | 1045290 | * | 10/1966 | .................. 37/302 |
| RU | 2011338 | * | 4/1994 | .................. 37/302 |
| SU | 1818011 | * | 5/1993 | .................. 37/302 |

* cited by examiner

*Primary Examiner*—Victor Batson
(74) *Attorney, Agent, or Firm*—George S. Gray (57) ABSTRACT

A grubbing tool is provided for attachment to an excavator or other earth working machine, of the type having extensions from the boom such as a dipper stick and dipper stick linkage. The tool is moved arcuately and vertically to pull rooted brush having substantially sized taproots. The excavator's power is optimized at the cutting blade by the attachment of the dipper stick and dipper stick linkage near the top of the tool, as well as, the sizing and the configuration of the two primary side members. The cutting blade and both side members have both front and rear cutting edges, allowing a fore and aft pattern of approaching brush which optimizes tool effectiveness. The side members have substantially straight front and rear edges, which can be positioned flush with the disturbed surface following brush removal, providing a leveling function as the tool is moved laterally. This flush positioning, in both directions, is made possible as a result of the optimal points of connection of the tool to the dipper stick and dipper stick linkage. The optimized connection points and compactness of the side members allow bracing between the side members to be placed near the top of the tool leaving the inside of the tool unobstructed, thereby adding increased operator visibility between the side members.

69 Claims, 4 Drawing Sheets

GRUBBING TOOL

BACKGROUND OF THE INVENTION

1. Field of the Invention

The present invention relates generally to removing rooted brush, small trees, and the like, using excavators and other earth working machines, including backhoes and trackhoes. Bushes, such as mesquite bushes, often have a taproot, of substantial diameter, and an extensive, attached root system having smaller diameters. The taproot is generally vertical, while many of the attached root system members are generally horizontal.

2. Description of the Prior Art

There are tools in the industry for removing rooted bushes and the like, and some can be utilized on an excavator such as a trackhoe or backhoe. Others perform as a plow and in other configurations.

Among those tools that are intended for excavators are the devices disclosed in U.S. Pat. No. 5,490,340, issued to Robert G. Muncy. A multi-piece coupling apparatus is provided, along with arcuate side members, and a cutting blade that is single-edged, notched and V-shaped.

Another device is disclosed in U.S. Pat. No. 3,353,285, issued to D. W. Murray. The Murray device is in two major sections, attached directly to the boom. A scissors effect is utilized for cutting as the two sections join during operation.

Another device is disclosed in U.S. Pat. No. 4,321,761, issued to Soren Hedblom. A forked member is moved into position under a tree stump. A second member rests against the ground, while the first member lifts the stump.

No prior tools offer a simple, multi-functional, dual-mode, compact grubbing tool for excavators of the type having a boom with a first and second extension, where the second extension moves with respect to the first.

What is needed is a simply configured grubbing tool for attachment to the first and second extensions of the boom on an excavator or other earth-working machine. The tool needed should be compact, should have both front and rear cutting blade edges, should optimize the power at the cutting blade edges, should have the ability to dig and cut both vertical and horizontal roots in both the fore and aft directions, should have simple bracing that optimizes the operator's visibility through the tool, and should be positionable such that it can be used as a leveler for post-removal surface maintenance.

SUMMARY OF THE PRESENT INVENTION

The present invention is a grubbing tool that can be coupled to the first and second extensions from the boom of an excavator or other earth-working machine. The tool is simply constructed and provides dual operational modes, such that the operator can cut both the main vertical tap root and horizontally oriented roots, and do so in both the fore and aft directions. Both front and rear facing horizontal cutting blade edges are provided, as well as, front and rear facing vertical cutting blade edges. The force acting on the root at tie horizontal cutting blade edge is efficiently transferred through the tool by the optimal configuration and sizing of the tool sides and attachment points to the excavator. Straight front and rear edges of the side members, and the location of the attachment points, allow the tool's front or rear edges to be positioned flush against the surface after the bush has been pulled and stacked. The operator can then sweep and level the ground surface by lateral movement of the tool. Bracing between the side members is positioned high within the tool, thus optimizing the operator's visibility through tie tool. The tool can also be rapidly used in a fore and aft shallow cutting technique that allows the very quick removal of large numbers of densely situated small bushes.

My invention provides a root grubbing tool for attachment to an excavator or earth working machine, of the type having a dipper stick and dipper stick linkage, comprising: a pair of side members, each side member having a front edge, a rear edge, a top edge, and a bottom edge; a first pair of coupler members directly attached to the side members to allow coupling of the side members to the dipper stick: a second pair of coupler members attached to the side members to allow coupling of the side members to the dipper stick linkage; and a cutting blade, the cutting blade attached proximate the side members' bottom edges, such that, when the dipper stick linkage is moved with respect to the dipper stick the root grubbing tool moves arcuately, the cutting blade having a front edge, the cutting blade front edge being beveled for cutting as the root grubbing tool is moved arcuately in the front direction.

In another embodiment, the side members' front edges form an angle of less than or equal to ninety degrees with respect to the cutting blade front edge.

In an additional embodiment, the cutting blade has a rear edge, the rear edge being beveled for cutting as the root grubbing tool is moved arcuately in the rear direction.

In an additional embodiment, the side members' front edges form an angle of less than or equal to ninety degrees with respect to the cutting blade front edge, and the side members' rear edges form an angle of less than or equal to ninety degrees with respect to the cutting blade rear edge.

In an additional embodiment, each of the side members' rear edges has a top portion and a bottom portion, the bottom portions being beveled.

In an additional embodiment, each of the side members' front and rear edges has a top portion and a bottom portion, the front and rear edge bottom portions being beveled.

In an additional embodiment, the side members' front edges are substantially straight.

In an additional embodiment, the side member's rear edges are substantially straight.

In an additional embodiment, the side members' front and rear edges are substantially straight.

In an additional embodiment, each of the side members' front edges has a top portion and a bottom portion, the bottom portions being beveled.

An additional embodiment further comprises a brace, the brace being attached to and between the side members proximate the first pair of coupler members.

An additional embodiment further comprises a brace, the brace being attached to and between the side members proximate the second pair of coupler members.

An additional embodiment further comprises a brace, the brace being attached to and between the side members, the brace being further attached to the first pair of coupler members.

An additional embodiment further comprises a brace, the brace being attached to and between the side members, the brace being further attached to the second pair of coupler members.

In an additional embodiment, the dipper stick has a hole and the dipper stick linkage has a hole, each of the first and second pair of coupler is members further having a hole, the first coupler member pair hole being alignable with the dipper stick hole such that a pin may be inserted through the first pair of coupler members and the dipper stick, the second coupler member pair hole being alienable with the dipper stick linkage hole such that a pin may be inserted through the second pair of coupler members and the dipper stick linkage, and at least one side member has a first hole, the at least one side member first hole being aligned with the dipper stick hole such that the pin inserted through the at least one side member first hole passes through the dipper stick hole, and at least one side member has a second hole, the at least one side member second hole being aligned with the dipper stick linkage hole such that the pin inserted through the at least one side member second hole passes through the dipper stick linkage hole, the insertions of the pins thus coupling the root grubbing tool to the dipper stick and the dipper stick linkage.

An additional embodiment further comprises means for locking the pins in the inserted position.

In an additional embodiment, the number of side member first holes for receiving a pin to be inserted in the dipper stick hole is two, and the number of side member second holes for receiving a pin to be inserted in the dipper stick linkage hole is two.

In an additional embodiment, the first and second coupling member pairs are attached to the side members proximate the side members' top edges.

My invention provides a root grubbing tool for attachment to an excavator or earth working machine, of the type having a dipper stick and dipper stick linkage, comprising: a pair of side members, each side member having a front edge; a rear edge; a top edge; a bottom edge; a front receptacle, each front receptacle having a hole for closely receiving a pin inserted through the dipper stick; a rear receptacle, each rear receptacle having a hole for closely receiving a pin inserted through the dipper stick linkage; at least one side member having a hole for closely receiving a pin to be inserted through the dipper stick; at least one side member having a hole for closely receiving a pin to be inserted through the dipper stick linkage; such that the side members retain the pin to be inserted through the dipper stick arid the pin to be inserted through the dipper stick linkage; and a cutting blade, the cutting blade attached to the side members' bottom edges, such that, when the dipper stick linkage is moved with respect to the dipper stick the root grubbing tool moves arcuately, the cutting blade having a front edge, the cutting blade front edge being beveled for cutting as the root grubbing tool is moved arcuately in the front direction.

My invention provides, a root grubbing tool for attachment to an excavator or earth working machine, of the type having a boom with first and second extensions, the second extension being movable with respect to the first, comprising: a pair of side members, eachside member having a front edge, a rear edge, a top edge, and a bottom edge; a first pair of coupler members directly attached to the side members to allow coupling of the side members to the first extension; a second pair of coupler members attached to the side members to allow coupling of the side members to the second extension; and a cutting blade, the cutting blade attached to the side members' bottom edges, such that, when the second extension is moved with respect to the first extension the root grubbing tool moves arcuately, the cutting blade having a front edge, the cutting blade front edge being beveled for cutting as the root grubbing tool is moved arcuately in the front direction.

My invention provides a root grubbing tool for attachment to an excavator or earth working machine, of the type having a dipper stick and dipper stick linkage, comprising: a pair of side members, each side member having a front edge, a rear edge, a top edge, and a bottom edge; means for attaching the dipper stick to the side members; means for attaching the dipper stick linkage to the side members; and a cutting blade, the cutting blade attached to the side members' bottom edges, such that, when the dipper stick linkage is moved with respect to the dipper stick the root grubbing tool moves arcuately, the cutting blade having a front edge, the cutting blade front edge being beveled for cutting as the root grubbing tool is moved arcuately in the front direction.

In an additional embodiment, the means for attaching the dipper stick further comprises means for receiving and securing a dipper stick pin, the pin passing through the dipper stick, and the means for attaching the dipper stick linkage further comprises means for receiving and securing a dipper stick linkage pin, the pin passing through the dipper stick linkage.

In an additional embodiment, the means for attaching the dipper stick further comprises a dipper stick pin and means for receiving and securing the dipper stick pin, the pin passing through the dipper stick, and the means for attaching the dipper stick linkage further comprises a dipper stick linkage pin and means for receiving and securing a dipper stick linkage pin, the pin passing through the dipper stick linkage.

My invention provides a root grubbing tool for attachment to an excavator or earth working machine, of the type having a boom with first and second extensions, the second extension being movable with respect to the first, comprising: a pair of side members, each side member having a front edge, a rear edge, a top edge, and a bottom edge; means for attaching the first extension to the side members; means for attaching the second extension to the side members; and a cutting blade, the cutting blade attached to the side members' bottom edges, such that, when the second extension is moved with respect to the first extension the root grubbing tool moves arcuately, the cutting blade having a front edge, the cutting blade front edge being beveled for cutting as the root grubbing tool is moved arcuately in the front direction.

In an additional embodiment, the means for attaching the first extension further comprises means for receiving and securing a first extension pin, the pin passing through the first extension, and the means for attaching the second extension further comprises means for receiving and securing a second extension pin, the pin passing through the second extension.

In an additional embodiment, the means for attaching the first extension further comprises a first extension pin and means for receiving and securing the first extension pin, the pin passing through the first extension, and the means for attaching the second extension further comprises a second extension pin and means for receiving and securing a second extension, the pin passing through the second extension.

My invention provides a method for removing rooted brush, bushes, shrubs, trees, and vegetation, using an excavator or earth working machine, of the type having a dipper stick and dipper stick linkage, comprising: attaching a tool having a pair of side members, the side members having front edges and rear edges, the side members being attached to the dipper stick and tie dipper stick linkage, the tool further having a cutting blade attached to the side members, the cutting blade having a beveled front edge and a beveled rear edge, the tool being attached for frontward and rearward arcuate motion as the dipper stick linkage moves with respect to the dipper stick; positioning the tool such that the cutting blade front edge encounters a root during frontward arcuate motion of the tool and then rotating the tool in a frontward arcuate motion; and positioning the tool such that the cutting blade rear edge encounters another root during rearward arcuate motion of the tool and then rotating the tool in a rearward arcuate motion.

An additional embodiment further comprises repeating either or both of the positioning and rotating steps for additional rooted brush and the like.

An additional embodiment further comprises lifting the dipper stick in conjunction with arcuate motion of the tool.

An additional embodiment further comprises moving the tool through the generally horizontally oriented roots remaining after the brush has been removed, such that the side members' rear edges cut such remaining roots, the side members' rear edges further having beveled cutting edges.

An additional embodiment further comprises positioning the side member front edges against the surface after the brush is removed, and leveling the surface by lateral movement of the tool across the surface.

An additional embodiment further comprises positioning the side member rear edges against the surface after the brush is removed, and leveling the surface by lateral movement of the tool across the surface.

My invention provides a method for removing rooted brush, bushes, shrubs, trees, and vegetation, using an excavator or earth working machine, of the type having a boom with first and second extensions, the second extension being movable with respect to the first, comprising: attaching a tool having a pair of side members, the side members having front edges and rear edges, the side members being attached to the first extension and the second extension, the tool further having a cutting blade attached to the side members, the cutting blade having a beveled front edge and a beveled rear edge, the tool being attached for frontward and rearward arcuate motion as the second extension moves with respect to the first extension; positioning the tool such that the cutting blade front edge encounters a root during frontward arcuate motion of the tool and then rotating the tool in a frontward arcuate motion; and positioning the tool such that the cutting blade rear edge encounters another root during rearward arcuate motion of the tool and then rotating the tool in a rearward arcuate motion.

An additional embodiment further comprises repeating either or both of the positioning and rotating steps for additional rooted brush and the like.

An additional embodiment further comprises lifting the first extension in conjunction with arcuate motion of the tool.

An additional embodiment further comprises moving the tool through the generally horizontally oriented roots remaining after the brush has been removed, such that the side members' rear edges cut such remaining roots, the side members' rear edges further having beveled cutting edges.

An additional embodiment further comprises positioning the side member front edges against the surface after the brush is removed, and leveling the surface by lateral movement of the tool across the surface.

An additional embodiment further comprises positioning the side member rear edges against the surface after the brush is removed, and leveling the surface by lateral movement of the tool across the surface.

An additional embodiment further comprises moving the tool through the generally horizontally oriented roots remaining after the brush has been removed, such that the side members' front edges cut such remaining roots, the side members' front edges further having beveled cutting edges.

An additional embodiment further comprises moving the tool through the generally horizontally oriented roots remaining after the brush has been removed, such that the side members' front edges cut such remaining roots, the side members' front edges fixer having beveled cutting edges.

The foregoing features and other advantages will appear from the description to follow. In the description reference is made to the accompanying drawings, which form a part hereof, and in which is shown by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate the Grubbing Tool of the present invention. With regard to the reference numerals used, the following numbering is used throughout the various drawing figures.

10 Grubbing Tool of the present invention
220 side member
22 side member top edge
24 side member front edge
26 side member rear edge
28 side member bottom edge
30 front receptacle
32 front receptacle hole
34 rear receptacle
36 rear receptacle hole
38 front receptacle brace
39 rear receptacle brace
40 cutting blade
42 cutting blade front edge 44 cutting blade rear edge
50 bevel on front side member
52 bevel on rear side member
60 dipper stick pin
62 dipper stick pin positioner
64 dipper stick pin positioner bolt
66 dipper stick pin positioner bolt hole in side member
70 dipper stick linkage pin
72 dipper stick linkage pin positioner
74 dipper stick linkage pin positioner bolt
76 dipper stick linkage pin positioner bolt hole in side member

DETAILED DESCRIPTION

Turning now descriptively to the drawings, in which similar reference characters denote similar elements throughout the several views, FIGS. 1–4 illustrate the Grubbing Tool of the present invention indicated generally by the numeral 10.

As used herein, all references to "front" refer to the side of the grubbing tool nearest the operator, while all references to "rear" refer to the side of the grubbing tool farthest from the operator.

The preferred embodiment of the grubbing tool 10 is shown in FIGS. 1–4. The grubbing tool 10 includes two side members 20, each side member 20 having a top edge 22, a front edge 24, a rear edge 26, a bottom edge 28, a front receptacle 30 with a hole 32 extending through both the front receptacle 30 and the side member 20, and a rear receptacle 34 with a hole 36 extending through both the rear receptacle 34 and the side member 20.

The side members 20 are constructed from steel, preferably structural steel, grade A36, with a thickness of approximately one inch (25 millimeters). The front receptacles 30 and rear receptacles 34 are approximately five inches (25 millimeters) in diameter, with the respective holes 32,36 being approximately three and one-eighth inches (78 millimeters) in diameter.

Figure 1:
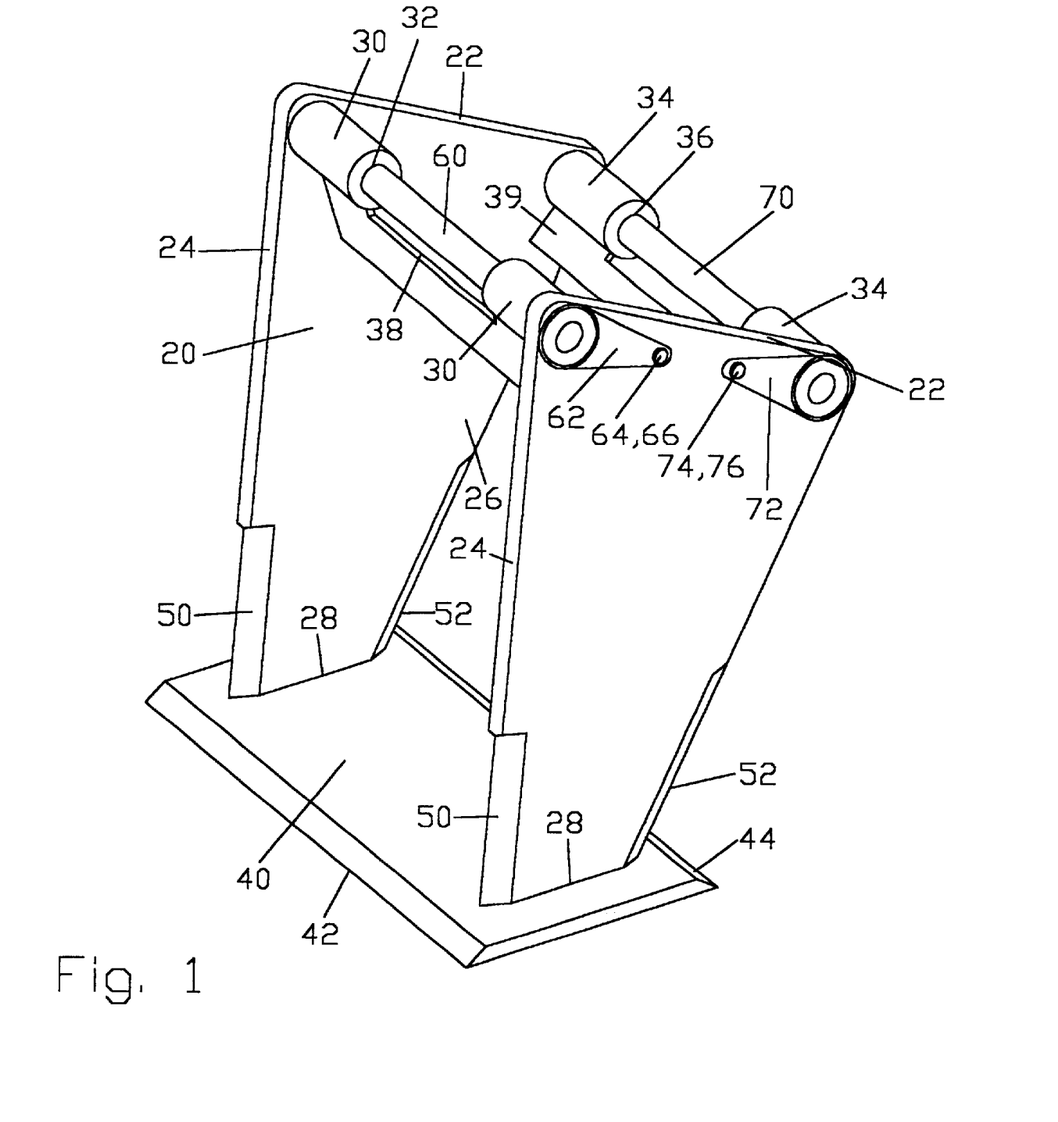
FIG. 1 is an oblique view of the preferred embodiment of the present invention.
Figure 2:
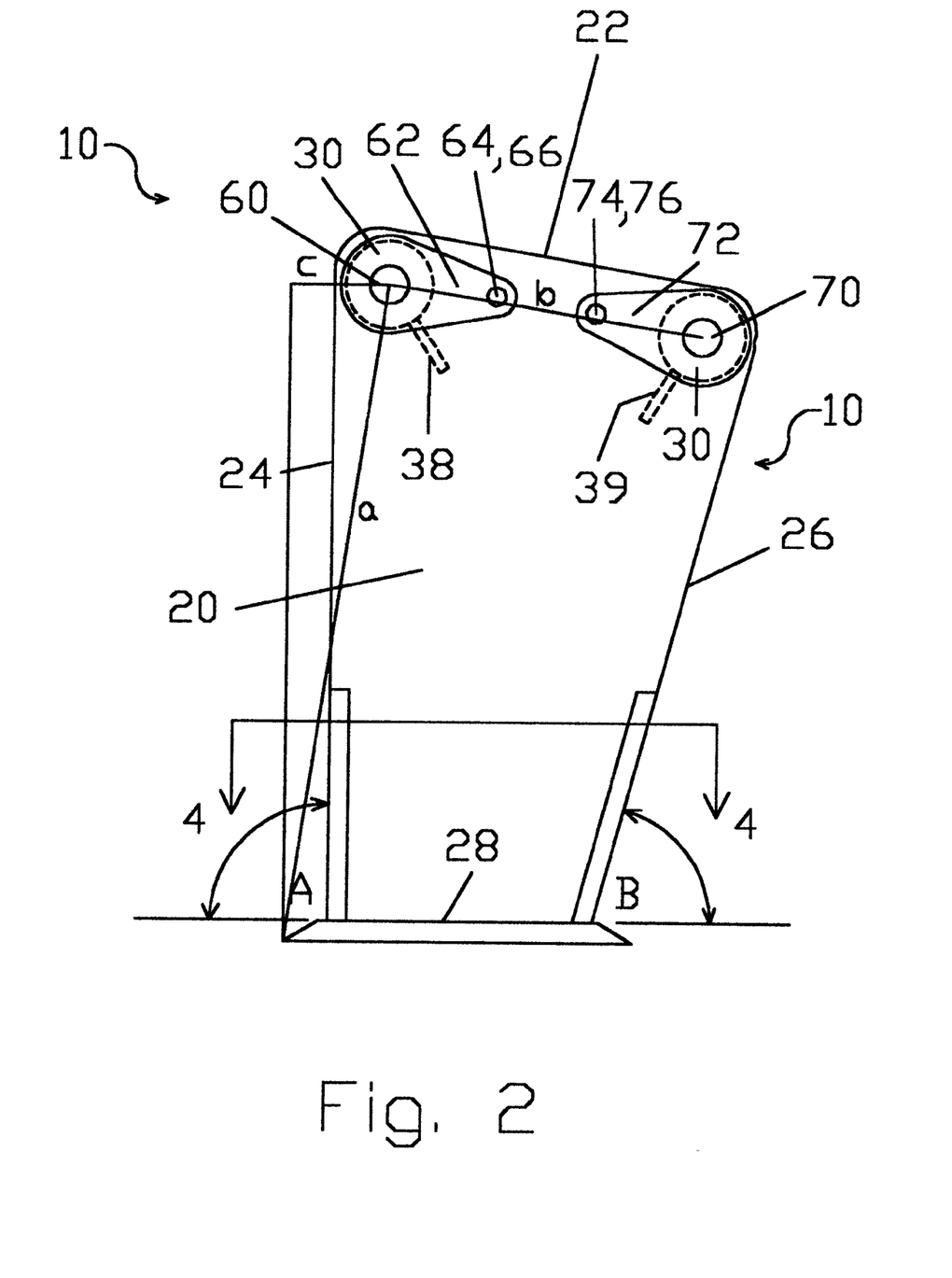
FIG. 2 is a side view of the preferred embodiment of the present invention, with the front edge of the side members facing to the left. Also depicted are angles A and B and lengths a, b and c as discussed herein.
Figure 3:
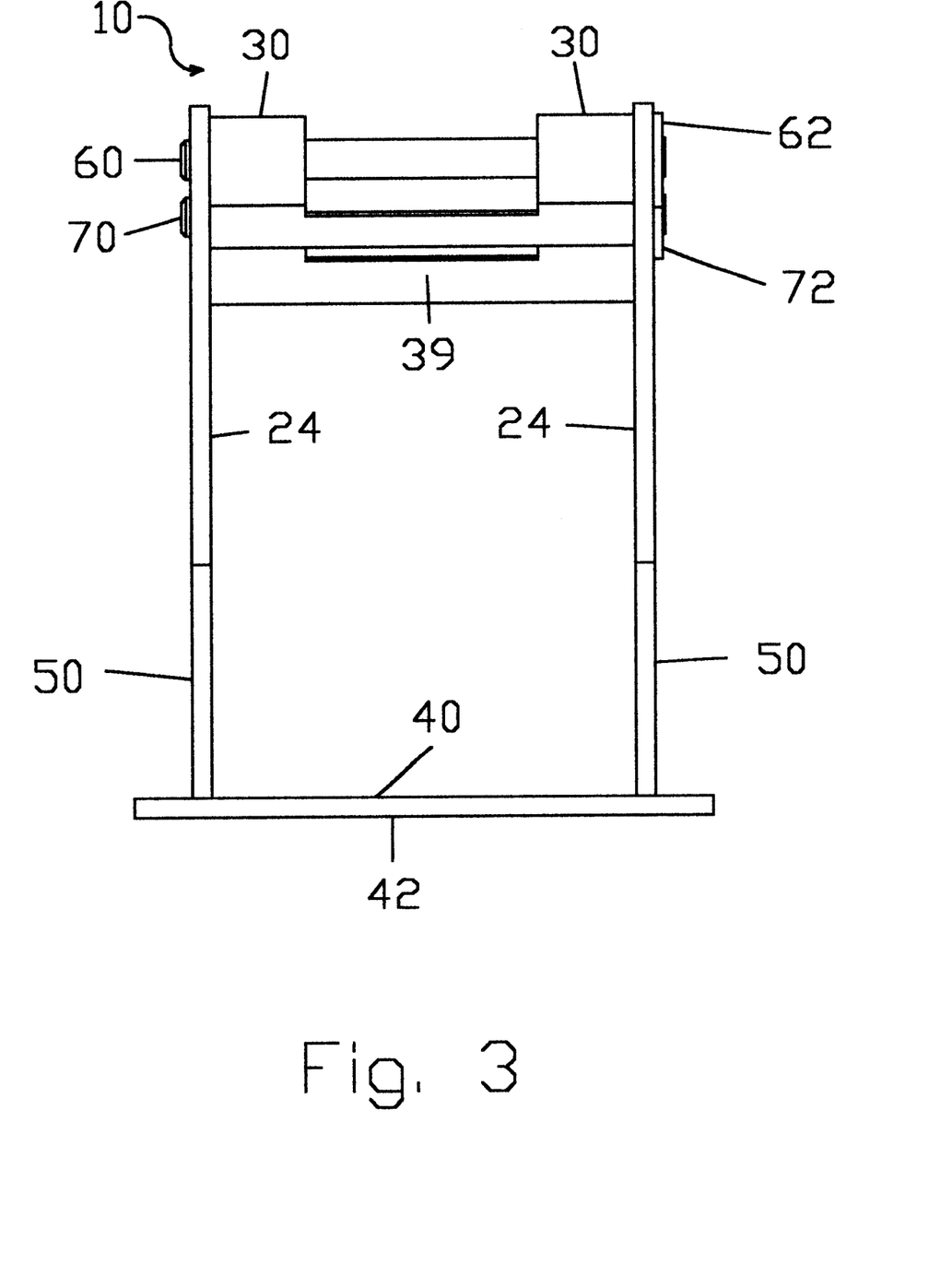
FIG. 3 is a front view of the preferred embodiment of the present invention.
Figure 4:
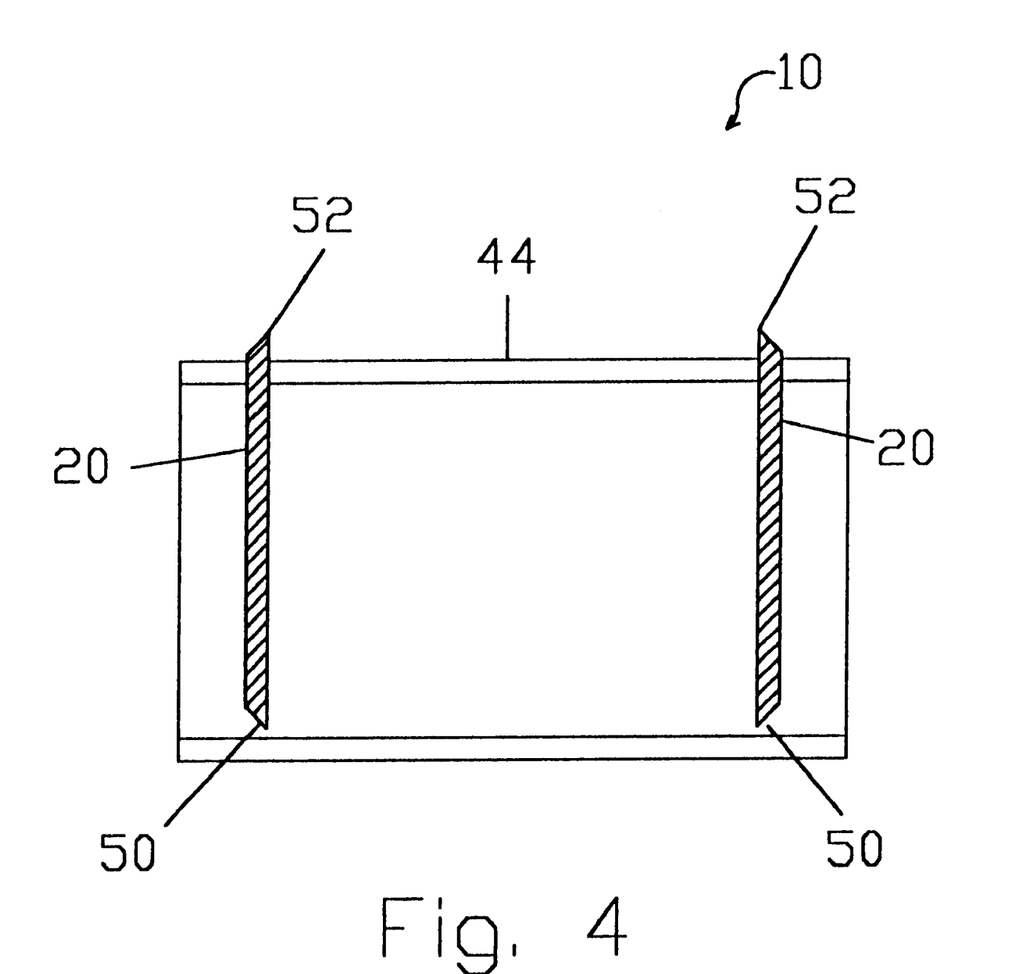
FIG. 4 is a sectional top view of the preferred embodiment of the present invention, cut along cutting plane 4—4, as shown on FIG. 2.

A brace 38 is attached between side members 20, and is also attached to the front receptacles 30, as shown in FIGS. 1–2. Similarly, a brace 39 is attached between the side members 20 and is further attached to the rear receptacles 34. The braces 38,39 are constructed from structural steel, grade A36, with an approximate thickness of one inch (25 millimeters). Although such braces 38,39 are attached to the front and rear receptacles 30,34 in the preferred embodiment, other embodiments are provided without such attachment, wherein the braces 38,39 remain proximate the receptacles 30,34.

A cutting blade 40 is attached to the side member bottom edges 28. The cutting blade 40 has a beveled front cutting edge 42 and rear cutting edge 44. The cutting blade 40 is constructed from tool steel, grade T1, with an approximate thickness of one inch (25 millimeters). In the preferred embodiment the cutting blade front edge 42 and cutting blade rear edge 44 are substantially straight, and the cutting blade is substantially flat, although other blade shapes can also be used, all in accordance with the present invention, and as determined by the intended end use for the overall device, as will occur to those of skill in the art upon review of the present disclosure.

Each side member 20 has a beveled front cutting edge 50 and a beveled rear cutting edge 52, proximate the cutting blade 40.

The grubbing tool 10 is attached to two extensions from the boom of the excavator. The first extension, typically known as the dipper stick, has a hole that aligns with the holes 32 in the front receptacles 30. When so aligned a dipper stick pin 60 can be inserted through the side member 20, through the front receptacle 30, through the dipper stick hole, through the second front receptacle 30, and on through the second side member 20. When so inserted a pin positioner 62 abuts the side member 20 where a bolt 64 secures the pin positioner 62 to the side member 20, by insertion into a threaded bolthole 66 in the side member 20.

The excavators second extension, typically linkage attached to the dipper stick, is similarly coupled to the grubbing tool 10. The dipper stick linkage has a hole that aligns with the holes 36 in the rear receptacles 34. When so aligned a dipper stick linkage pin 70 can be inserted through the side member 20, through the rear receptacle 34, through the dipper stick linkage hole, through the second rear receptacle 34, and on through the second side member 20. When so inserted a second pin positioner 72 abuts the side member 20 where a bolt 74 secures the pin positioner 72 to the side member 20, by insertion into a threaded bolthole 76 in the side member 20.

Although the foregoing pin 60,70 coupling is common in the industry, other rotatable coupling mechanisms, for adaptation to changes in the first and second excavator extensions, can also be used, all in accordance with the present invention, and as determined by the intended end use for the overall device, as will occur to those of skill in the art upon review of the present disclosure. Similarly, the pin 60,70 locking mechanism can be replaced with other locking devices, e.g. appropriately sized cotter keys, caps, etc.

The primary grubbing operation involves placing the cutting blade front edge 42 in position to encounter the root beneath the ground surface during an arcuate motion of the grubbing tool 10 about pin 60.

The excavator operator can forcefully rotate the grubbing tool about pin 60 within the front receptacles 30 by displacing the dipper stick linkage with a pressurized piston rod extending from a crowd cylinder. This motion causes the cutting blade 40 to move arcuately about the pin 60, while the dipper stick linkage rotates freely about pin 70 as it pushes or pulls on pin 70. The force exerted by the dipper stick linkage, while pushing against pin 70, results in a moment about pin 60, which will be designated as clockwise herein.

As the grubbing tool 10 encounters a root, the forward arcuate motion of the cutting blade front edge 42 is resisted, resulting in a counter-clockwise moment about pin 60. It is desirable that the available power of the excavator be maximized by sizing the side members 20 such that the clockwise moment for a given amount of force, is as large as reasonably possible given other design restraints on the size of the side members 20. It is correspondingly desirable to minimize the counterclockwise moment subject to the same restraints.

As shown in FIG. 2, length a, between the centers of the front receptacles 30 and the rear receptacles 34, is substantial when compared to length b between the center of the front receptacles 30 and the cutting blade front edge 42. In the preferred embodiment the ratio of b/a approaches 2:1.

By maximizing length a, and minimizing length b, the clockwise moment is increased and the counter-clockwise moment is decreased. This optimizes the efficiency of the excavator's power as the dipper stick linkage pushes against pin 70.

In the preferred embodiment, length b is significantly shortenable by shaping the side members 20 such that the side member front edge 24 forms an acute or right angle with the plane of the cutting blade 40, as shown in FIG. 2.

Length a, as mentioned, should be as long as possible, subject to other design restraints such as the dipper stick linkage configuration. To be in the desirable mid-range of dipper stick linkage motion, length a should be chosen such that the dipper stick and the nearest link in the dipper stick linkage are approximately perpendicular to length a at the beginning of the grubbing operation. At the beginning of the operation the cutting blade 40 is usually placed at an angle of approximately 40–50 degrees. When so positioned, the preferred embodiment is configured such that both the dipper stick and the nearest dipper stick linkage are approximately perpendicular to length a. A shorter length a, both reduces the desirable clockwise moment, and moves the dipper stick linkage to a less favorable position in its available range of motion at the start of the grubbing operation.

A substantially vertical pull force is also an important aspect of the grubbing operation. When encountering the root with the cutting blade front edge 42, the vertical force will be applied at the cutting blade front edge 42, primarily as a result of the force applied by the dipper stick on pin 60.

For a given amount of force applied vertically to pin 60, the force at the cutting blade front edge 42 will be maximized by shortening length c, as shown in FIG. 2. When angle A is a right or acute angle length c is so shortened, and at some point the vertical force acting through pin 70 contributes more effectively to the overall vertical pull capability. When angle A is obtuse, length c is increased with a corresponding lack of vertical pull efficiency through pin 60, and the contribution of the pulling force through pin 70 diminishes rapidly.

An alternate operational mode uses the cutting blade rear edge 44 to encounter roots on bushes on the far side of the grubbing tool 10, from the excavator operator. This feature allows the operator to clear bushes both on the near side and far sides of the grubbing tool 10, in an alternating forward and rearward pattern. This is especially useful in heavy concentrations of smaller bushes where a quick succession of relatively shallow approaches to the bushes allows the operator to clear a substantial area very quickly.

Both the side member front edges 24 and the side member rear edges 26 have vertical cutting edges 50,52. Both sets of vertical cutting edges 50,52 perform a root cutting function on the first arcuate cutting motion. Due to the extensive root systems of some bushes, e.g. mesquite, a second arcuate cutting motion is often desirable to snag or cut one or more generally horizontal secondary roots that may still be attached and in the ground due to their extensive length. Having both front and rear side member cutting edges 50,52 allows the operator to choose the most advantageous approach for this second pass, i.e. either a frontward or rearward arcuate motion.

In the preferred embodiment the side member front edges 24 are substantially straight. This is particularly advantageous over a curved front edge, in that the operator can manipulate the dipper stick linkage such that the grubbing tool's side member front edges 24 are substantially parallel and flush with the ground. Although displaced dirt readily passes through the uncluttered center of the grubbing tool 10, the removal of a larger bush will often leave piles of displaced dirt and holes. When the straight side member front edges 24 are placed against the ground surface, the operator can smooth the surface by lateral movement of the grubbing tool 10. This orientation of the grubbing tool 10 is assisted by the sizing of length a and angle A. If length a is too short the dipper stick linkage cannot effectively position the side member front edge 24 in a horizontal orientation. The problem is compounded as angle A becomes more obtuse.

In the preferred embodiment, the side member rear edges 26 are also straight, and can be horizontally oriented to perform the same sweeping and leveling operation. With both sides so usable, the effective sweeping range is increased, and the efficiency of the clean up operation is enhanced accordingly.

Although particular types of materials and particular dimensions have been discussed herein, other types and sizes of materials, such as various grades of steel, can also be used, all in accordance with the present invention, and as determined by the intended end use for the overall device, as will occur to those of skill in the art upon review of the present disclosure.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various brush removal applications without omitting features that, from the standpoint of prior art, fairly constitute essential characteristics of the generic or specific aspects of this invention.

What is claimed as new and desired to be protected by letters patent is set forth in the appended claims:

1. A root grubbing tool for attachment to an excavator or earth working machine, of the type having a dipper stick and dipper stick linkage, comprising:
    a pair of side members, each side member hat a front edge, a rear edge, a top edge, and a bottom edge;
    a first pair of coupler members directly attached to the side members to allow coupling of the side members to the dipper stick;
    a second pair of coupler members attached to the side members to allow coupling of the side members to the dipper stick linkage; and
    a cutting blade, the cutting blade attached proximate the side members' bottom edges, such that, when the dipper stick linkage is moved with respect to the dipper stick the root grubbing tool moves arcuately, the cutting blade having a front edge, the cutting blade front edge being beveled for cutting as the root grubbing tool is moved arcuately in the front direction.

2. The device of claim 1, wherein the side members' front edges form an angle of less than or equal to ninety degrees with respect to the cutting blade front edge.

3. The device of claim 1, wherein the cutting blade has a rear edge, the rear edge being beveled for cutting as the root grubbing tool is moved arcuately in the rear direction.

4. The device of claim 3, wherein the side members' front edges form an angle of less than or equal to ninety degrees with respect to the cutting blade front edge, and further wherein the side members' rear edges form an angle of less than or equal to ninety degrees with respect to the cutting blade rear edge.

5. The device of claim 3, wherein each of the side members' rear edges has a top portion and a bottom portion, the bottom portions being beveled.

6. The device of claim 3, wherein each of the side members' front and rear edges has a top portion and a bottom portion, the front and rear edge bottom portions being beveled.

7. The device of claim 1, wherein the side members' front edges are substantially straight.

8. The device of claim 1, wherein the side member's rear edges are substantially straight.

9. The device of claim 1, wherein the side members' front and rear edges are substantially straight.

10. The device of claim 1, wherein each of the side members' front edges has a top portion and a bottom portion, the bottom portions being beveled.

11. The device of claim 1, further comprising a brace, the brace being attached to and between the side members proximate the first pair of coupler members.

12. The device of claim 1, further comprising a brace, the brace being attached to and between the side members proximate the second pair of coupler members.

13. The device of claim 1, further comprising a brace, the brace being attached to and between the side members, the brace being further attached to the first pair of coupler members.

14. The device of claim 1, further comprising a brace, the brace being attached to and between the side members, the brace being further attached to the second pair of coupler members.

15. The device of claim 1, wherein the dipper stick has a hole and the dipper stick linkage has a hole, each of the first and second pair of coupler members further having a hole, the first coupler member pair hole being alignable with the dipper stick hole such that a pin may be inserted through the first pair of coupler members and the dipper stick, the second coupler member pair hole being alignable with the dipper stick linkage hole such that a pin may be inserted through the second pair of coupler members and the dipper stick linkage, and further wherein at least one side member has a first hole, the at least one side member first hole being aligned with the dipper stick hole such that the pin inserted through the at least one side member first hole passes through the dipper stick hole, and further wherein at least one side member has a second hole, the at least one side member second hole being aligned with the dipper stick linkage hole such that the pin inserted through the at least one side member second hole passes through the dipper stick linkage hole, the insertions of the pins thus coupling the root grubbing tool to the dipper stick and the dipper stick linkage.

16. The device of claim 15, further comprising means for locking the pins in the inserted position.

17. The device of claim 15, wherein the number of side member first holes for receiving a pin to be inserted in the dipper stick hole is two, and further wherein the number of side member second holes for receiving a pin to be inserted in the dipper stick linkage hole is two.

18. The device of claim 1, wherein the first and second coupling member pairs are attached to the side members proximate the side members' top edges.

19. A root grubbing tool for attachment to an excavator or earth working machine, of the type having a dipper stick and dipper stick linkage, comprising:
a pair of side members, each side member having:
a front edge;
a rear edge;
a top edge;
a bottom edge;
a front receptacle, each front receptacle having a hole for closely receiving a pin inserted through the dipper stick;
a rear receptacle, each rear receptacle having a hole for closely receiving a pin inserted through the dipper stick linkage;
at least one side member having a hole for closely receiving a pin to be inserted through the dipper stick;
at least one side member having a hole for closely receiving a pin to be inserted through the dipper stick linkage;
such that the side members retain the pin to be inserted through the dipper stick and the pin to be inserted through the dipper stick linkage; and
a cutting blade, the cutting blade attached to the side members' bottom edges, such that, when the dipper stick linkage is moved with respect to the dipper stick the root grubbing tool moves arcuately, the cutting blade having a front edge, the cutting blade font edge being beveled for cutting as the root grubbing tool is moved arcuately in the front direction.

20. The device of claim 19, further comprising means for locking the pins in the inserted position.

21. The device of claim 19, wherein the number of side member holes for receiving a pin inserted in the dipper stick is two, and further wherein the number of side member holes for receiving a pin inserted in the dipper stick linkage is two.

22. The device of claim 19, wherein the side members' front edges form an angle of less than or equal to ninety degrees with respect to the cutting blade front edge.

23. The device of claim 19, wherein the cutting blade has a rear edge, the rear edge being beveled for cutting as the root grubbing tool is moved arcuately in the rear direction.

24. The device of claim 23, wherein the side members' front edges form an angle of less than or equal to ninety degrees with respect to the cutting blade front edge, and further wherein the side members' rear edges form an angle of less than or equal to ninety degrees with respect to the cutting blade rear edge.

25. The device of claim 23, wherein each of the side members' rear edges has a top portion and a bottom portion, the bottom portions being beveled.

26. The device of claim 23, wherein each of the side members' front and rear edges has a top portion and a bottom portion, the front and rear edge bottom portions being beveled.

27. The device of claim 19, wherein the side members' front edges are substantially straight.

28. The device of claim 19, wherein the side members' rear edges are substantially straight.

29. The device of claim 19, wherein the side members' front and rear edges are substantially straight.

30. The device of claim 19, wherein each of the side members' front edges has a top portion and a bottom portion, the bottom portions being beveled.

31. The device of claim 19, further comprising a brace, the brace being attached to and between the side members proximate the front receptacles.

32. The device of claim 19, further comprising a brace, the brace being attached to and between the side members proximate the rear receptacles.

33. The device of claim 19, further comprising a brace, the brace being attached to and between the side members, the brace being further attached to the front receptacles.

34. The device of claim 19, further comprising a brace, the brace being attached to and between the side members, the brace being further attached to the rear receptacles.

35. The device of claim 19, wherein the side members' first and second receptacles are proximate the side members' top edges.

36. A root grubbing tool for attachment to an excavator or earth workin g machine, of the type having a boom with first and second extensions, the second extension being movable with respect to the first, comprising:
- a pair of side members, each side member having a front edge, a rear edge, a top edge, and a bottom edge;
- a first pair of coupler members directly attached to the side members to allow coupling of the side members to the first extension;
- a second pair of coupler members attached to the side members to allow coupling of the side members to the second extension and
- a cutting blade, the cutting blade attached to the side members' bottom edges, such that, when the second extension is moved with respect to the first extension the root grubbing tool moves arcuately, the cutting blade having a front edge, the cutting blade front edge being beveled for cutting as the root grubbing tool is moved arcuately in the front direction.

37. The device of claim 36, wherein the side members' front edges form an angle of less than or equal to ninety degrees with respect to the cutting blade front edge.

38. The device of claim 36, wherein the cutting blade has a rear edge, the rear edge being beveled for cutting as the root grubbing tool is moved arcuately in the rear direction.

39. The device of claim 38, wherein the side members' front edges form an angle of less than or equal to ninety degrees with respect to the cutting blade front edge, and further wherein the side members' rear edges form an angle of less than or equal to ninety degrees with respect to the cutting blade rear edge.

40. The device of claim 38, where in each of the side members' rear edges has a top portion and a bottom portion, the bottom portions being beveled.

41. The device of claim 38, wherein each of the side members' front and rear edges has a top portion and a bottom portion, the front and rear edge bottom portions being beveled.

42. The device of claim 36, wherein the first and second coupling member pairs are attached to the side members proximate the side members' top edges.

43. The device of claim 36, wherein the side members' front edges are substantially straight.

44. The device of claim 36, wherein the side members' rear edges are substantially straight.

45. The device of claim 36, wherein the side members' front and rear edges are substantially straight.

46. The device of claim 36, further comprising a brace, the brace being attached to and between the side members proximate the first pair of coupler members.

47. The device of claim 36, further comprising a brace, the brace being attached to and between the side members proximate the second pair of coupler members.

48. The device of claim 36, further comprising a brace, the brace being attached to and between the side members, the brace being further attached to the first pair of coupler members.

49. The device of claim 36, further comprising a brace, the brace being attached to and between the side members, the brace being further attached to the second pair of coupler members.

50. A root grubbing tool for attachment to an excavator or earth working machine, of the type having a dipper stick and dipper stick linkage, comprising:
- a pair of side members, each side member having a front edge, a rear edge, a top edge, and a bottom edge;
- means for attaching the dipper stick to the side members;
- means for attaching the dipper stick linkage to the side members; and
- a cutting blade, the cutting blade attached to the side members' bottom edges, such that, when the dipper stick linkage is moved with respect to the dipper stick the root grubbing tool moves arcuately, the cutting blade having a front edge, the cutting blade front edge being beveled for cutting as the root grubbing tool is moved arcuately in the front direction.

51. The device of claim 50, wherein the means for attaching the dipper stick further comprises means for receiving and securing a dipper stick pin, the pin passing through the dipper stick, and wherein the means for attaching the dipper stick linkage further comprises means for receiving and securing a dipper stick linkage pin, the pin passing through the dipper stick linkage.

52. The device of claim 50, wherein the means for attaching the dipper stick further comprises a dipper stick pin and means for receiving and securing the dipper stick pin, the pin passing through the dipper stick, and wherein the means for attaching the dipper stick linkage further comprises a dipper stick linkage pin and means for receiving and securing a dipper stick linkage pin, the pin passing through the dipper stick linkage.

53. A root grubbing tool for attachment to an excavator or earth working machine, of the type having a boom with first and second extensions, the second extension being movable with respect to the first, comprising:
- a pair of side members, each side member having a front edge, a rear edge, a top edge, and a bottom edge;
- means for attaching the first extension to the side members;
- means for attaching the second extension to the side members; and
- a cutting blade, the cutting blade attached to the side members' bottom edges, such that, when the second extension is moved with respect to the first extension the root grubbing tool moves arcuately, the cutting blade having a front edge, the cutting blade front edge being beveled for cutting as the root grubbing tool is moved arcuately in the front direction.

54. The device of claim 53, wherein the means for attaching the first extension further comprises means for receiving and securing a first extension pin, the pin passing through the first extension, and wherein the means for attaching the second extension further comprises means for receiving and securing a second extension pin, the pin passing through the second extension.

55. The device of claim 53, wherein the means for attaching the first extension further comprises a first extension pin and means for receiving and securing the first extension pin, the pin passing through the first extension, and wherein the means for attaching the second extension further comprises a second extension pin and means for receiving and securing a second extension, the pin passing through the second extension.

56. A method for removing rooted brush, bushes, shrubs, trees, and vegetation, using an excavator or earth working machine, of the type having a dipper stick and dipper stick linkage, comprising:
- attaching a tool having a pair of side members, the side members having front edges and rear edges, the side members being attached to the dipper stick and the dipper stick linkage, the tool ether having a cutting blade attached to the side members, the cutting blade having a beveled front edge and a beveled rear edge, the tool being attached for frontward and rearward arcuate motion as the dipper stick linkage moves with respect to the dipper stick;

positioning the tool such that the cutting blade front edge encounters a root during frontward arcuate motion of the tool and then rotating the tool in a frontward arcuate motion; and positioning the tool such that the cutting blade rear edge encounters another root during rearward arcuate motion of the tool and then rotating the tool in a rearward arcuate.

57. The method of claim 56, further comprising repeating either or both of the positioning and rotating steps for additional rooted brush.

58. The method of claim 56, further comprising lifting the dipper stick in conjunction with arcuate motion of the tool.

59. The method of claim 56, further comprising moving the tool through the generally horizontally oriented roots remaining after the brush has been removed, such that the side members' rear edges cut such remaining roots, the side members' rear edges further having beveled cutting edges.

60. The method of claim 56, further comprising positioning the side member front edges against the surface after the brush is removed, and leveling the surface by lateral movement of the tool across the surface.

61. The method of claim 56, further comprising positioning the side member rear edges against the surface after the brush is removed, and leveling the surface by lateral movement of the tool across the surface.

62. The method of claim 56, further comprising moving the tool through the generally horizontally oriented roots remaining after the brush has been removed, such that the side members' front edges cut such remaining roots, the side members' front edges further having beveled cutting edges.

63. A method for removing rooted brush, bushes, shrubs, trees, and vegetation, using an excavator or earth working machine, of the type having a boom with first and second extensions, the second extension being movable with respect to the first, comprising:

attaching a tool having a pair of side members, the side members having front edges and rear edges, the side members being attached to the first extension and the second extension, the tool further having a cutting blade attached to the side members, the cutting blade having a beveled front edge and a beveled rear edge, the tool being attached for frontward and rearward arcuate motion as the second extension moves with respect to the first extension;

positioning the tool such that the cutting blade front edge encounters a root during frontward arcuate motion of the tool and then rotating the tool in a frontward arcuate motion; and positioning the tool such that the cutting blade rear edge encounters another root during rearward arcuate motion of the tool and then rotating the tool in a rearward arcuate motion.

64. The method of claim 63, further comprising repeating either or both of the postioning and rotating for additional rooted brush.

65. The method of claim 63, further comprising lifting the first extension in conjunction with arcuate motion of the tool.

66. The method of claim 63, further comprising moving the tool through the generally horizontally oriented roots remaining after the brush has been removed, such that the side members' rear edges cut such remaining roots, the side members' rear edges further having beveled cutting edges.

67. The method of claim 63, further comprising positioning the side member front edges against the surface after the brush is removed, and leveling the surface by lateral movement of the tool across the surface.

68. The method of claim 63, further comprising positioning the side member rear edges against the surface after the brush is removed, and leveling the surface by lateral movement of the tool across the surface.

69. The method of claim 63, further comprising moving the tool through the generally horizontally oriented roots remaining after the brush has been removed, such that the side members' front edges cut such remaining roots, the side members' front edges further having beveled cutting edges.

* * * * *